Patented Nov. 6, 1923.

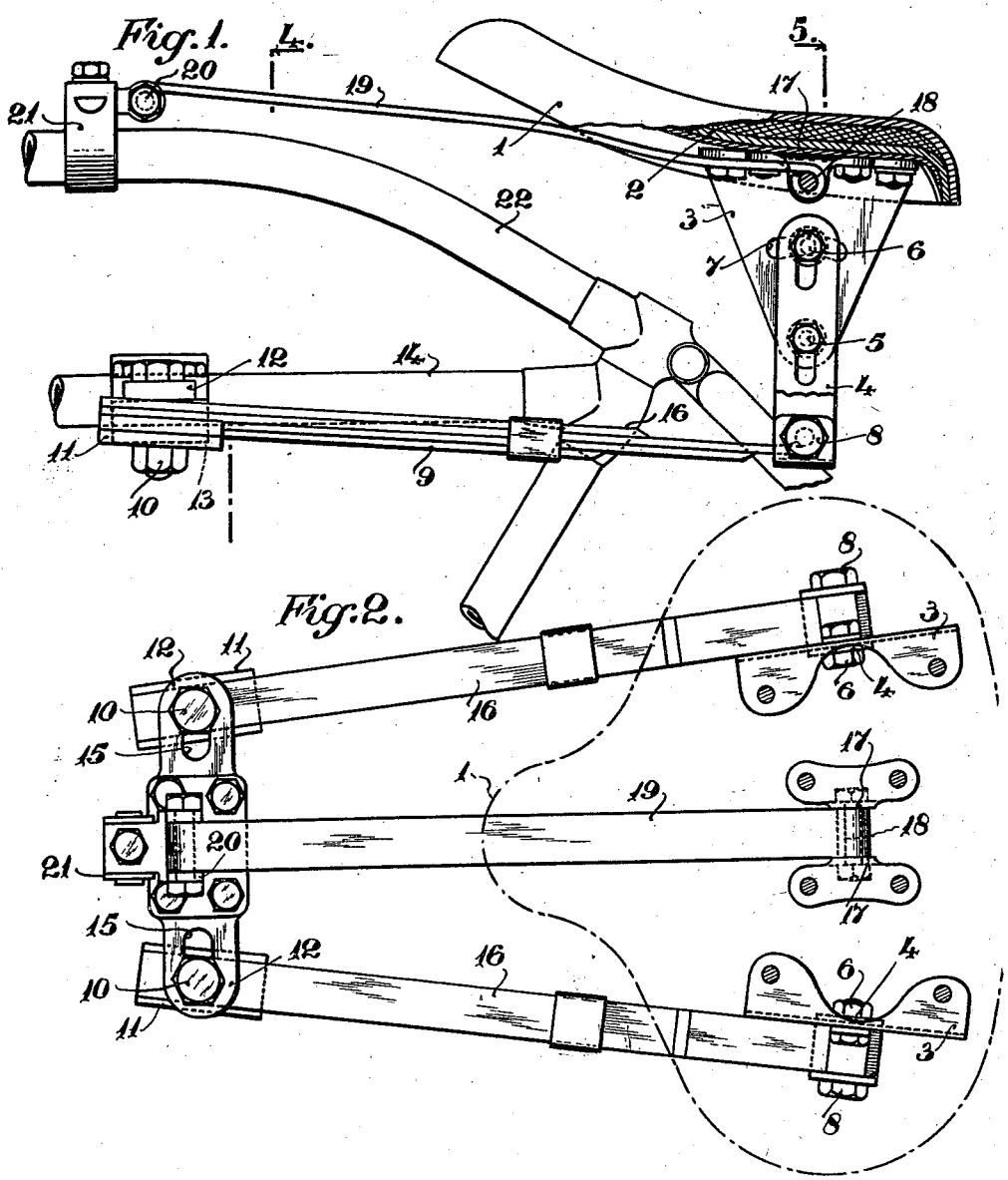

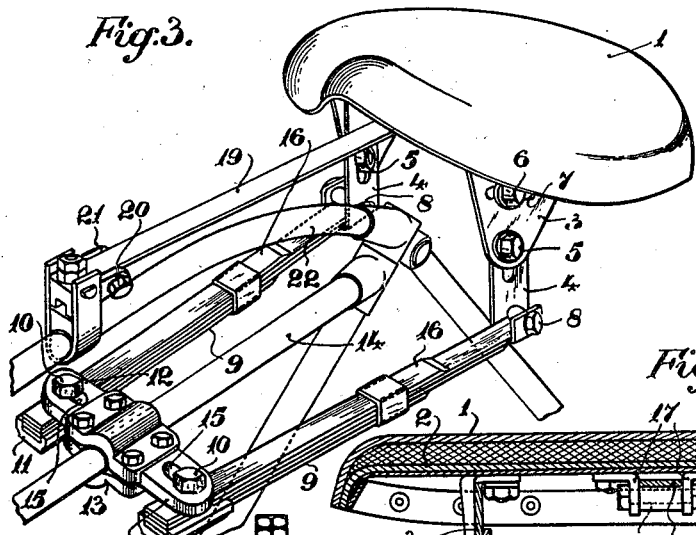
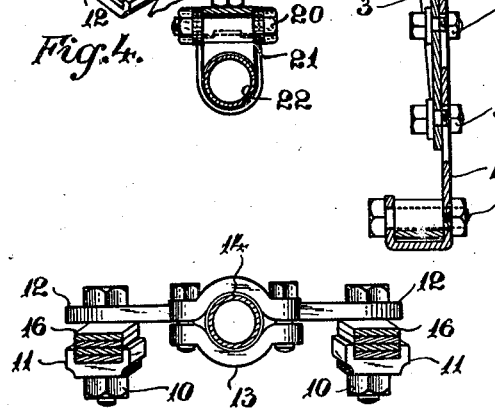
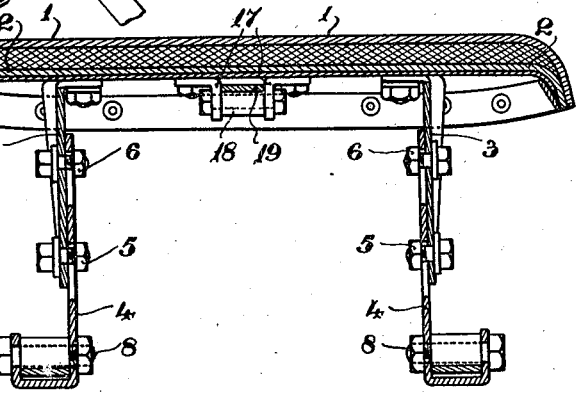

1,473,462

UNITED STATES PATENT OFFICE.

GUY HENRY CHAMP AND GEORGE ERNEST OSBORNE KAY, OF WARWICK, ENGLAND, ASSIGNORS TO J. B. BROOKS AND COMPANY LIMITED, OF BIRMINGHAM, ENGLAND.

MOTOR-CYCLE AND LIKE SADDLE.

Application filed June 2, 1922. Serial No. 565,293.

*To all whom it may concern:*

Be it known that we, GUY HENRY CHAMP and GEORGE ERNEST OSBORNE KAY, subjects of the King of Great Britain, residing at Warwick, England, have invented certain new and useful Improvements Connected with Motor-Cycle and like Saddles, of which the following is a specification.

This invention relates to motor-cycle and like saddles, but refers more particularly to means for mounting or supporting the saddle upon the frame of the machine, said means being of that type comprising a plurality of parallel-motion members arranged in upper and lower planes and connected at opposite ends respectively to the machine and to the saddle, one or more of said members consisting of leaf springs which support the load as well as co-operate with one another or with other members to impart a parallel motion to the saddle.

According to the present invention three parallel-motion members are employed, arranged in upper and lower planes, two in one plane and one in another plane, giving a triangular arrangement.

Figure 1 of the accompanying drawings is a side elevation partly in section of a motor-cycle saddle attached to the frame of a motor-cycle.

Figure 2 is an underside plan of the saddle.

Figure 3 is a perspective view of the saddle attached to the machine, the petrol tank of the latter not being shown.

Figure 4 represents a cross-section on line 4—4, Figure 1.

Figure 5 is a cross-section on line 5—5, Figure 1.

The rigid saddle top 1 has bolted to the metal under-plate 2, near opposite sides, a pair of depending brackets 3, 3, to which are attached plates or hangers 4, 4, adjustable vertically and also angularly in order to allow of variations in the height and tilt of the saddle. The vertical adjustment is obtained by means of bolts 5, 6, passing through the brackets 3, 3, and through vertical slots in the hangers, while the angular adjustment is obtained by the fact that the lower bolts 5 pass through plain holes in the brackets 3, and so serve as pivots, whereas the upper bolts 6 pass through and are slidable within quadrant slots 7 in the said brackets 3.

The lower ends of the hangers 4, 4 are turned outwards and upwards, and carry transverse pins 8, 8 secured by nuts and to which are pivotally attached the rear ends of a pair of canti-lever laminated leaf springs 9, 9. These springs are arranged longitudinally in the same horizontal plane one upon each side of the frame of the machine below the level of the usual petrol tank, and their forward built-up ends are securely fixed, by means of bolts 10 and clamping plates 11, to laterally extending brackets 12 secured by a clip 13 to the member 14 of the frame of the machine. The bolts 10 pass through slots 15 in the brackets to allow for lateral adjustment. The rear ends of the springs are attached to the pins 8 by turning over the end of the top or main leaf into an eye and passing the pin through it. The springs 9 are preferably fitted with check leaves 16 arranged above the main leaf, the whole of the leaves of each spring being tied together by band clips, as usual.

Bolted to the middle of the seat plate 2 of the saddle is a pair of brackets 17, 17, carrying between them a pin 18 upon which is pivotally mounted the rear end of a single upper spring 19 forming a link member, the forward end of this spring being pivotally connected to a pin 20 carried by a clip 21 attached to the top tube 22 of the frame. The said spring 19 consists of a single leaf and is arranged in the median line with respect to the lower springs 9, 9. The load is supported by the latter, but the upper spring 19 co-operates with them to ensure a substantially parallel motion to the saddle top 1.

Preferably the forward ends of the springs 9, 9, and of the spring or link 19 are attached to the frame midway in the longitudinal distance between the axis of the road wheels of the cycle, this position resulting in a minimum of road shocks being transmitted to the rider.

Having fully described our invention, what we desire to claim and secure by Letters Patent is:—

1. Means for resiliently supporting motor-cycle and like saddles comprising three parallel-motion members substantially of equal length of which at least one is a leaf spring, means for mounting the members in superimposed parallel planes two in a lower plane upon opposite sides of the machine frame and one in an upper plane centrally above the machine, means for connecting the corresponding ends of the members to the saddle, and means for connecting the opposite corresponding ends of the members to the machine at definite fixed positions on the latter, said positions being situated in a plane substantially parallel to the plane in which are situated the points of connection of the said members to the saddle.

2. Means for resiliently supporting motor-cycle and like saddles comprising three parallel-motion members substantially of equal length consisting of two leaf springs and a single link, means for mounting the leaf springs in a lower horizontal plane, means for mounting the single link in an upper plane in central parallel relation with the leaf springs, means for connecting the rear ends of the springs and link to the saddle all in the same substantially vertical plane and means for connecting the forward ends of the springs and link to the machine at definite fixed positions on the latter all in the same substantially-vertical plane.

In testimony whereof we have hereunto set our hands in presence of two subscribing witnesses.

GUY HENRY CHAMP.
GEORGE ERNEST OSBORNE KAY.

Witnesses:
C. NOWELL,
F. N. MASKELL.